United States Patent
Syamala et al.

(10) Patent No.: US 10,447,773 B2
(45) Date of Patent: Oct. 15, 2019

(54) AGGREGATING VEHICLE-RELATED BIG DATA

(71) Applicant: General Motors LLC, Detroit, MI (US)

(72) Inventors: Rejani D. Syamala, Troy, MI (US); Rajesh S. Paul, Northville, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 315 days.

(21) Appl. No.: 14/982,531

(22) Filed: Dec. 29, 2015

(65) Prior Publication Data

US 2017/0187787 A1   Jun. 29, 2017

(51) Int. Cl.
*G06F 15/16* (2006.01)
*H04L 29/08* (2006.01)
*H04L 29/06* (2006.01)

(52) U.S. Cl.
CPC ...... *H04L 67/1002* (2013.01); *H04L 67/1008* (2013.01); *H04L 67/1038* (2013.01); *H04L 67/12* (2013.01); *H04L 67/2833* (2013.01); *H04L 69/22* (2013.01); *H04L 67/26* (2013.01)

(58) Field of Classification Search
CPC . H04L 67/1008; H04L 67/1038; H04L 67/12; H04L 67/2833; H04L 67/1002; H04L 69/22
USPC ....... 709/226, 227, 246, 240, 203, 201, 223, 709/224; 370/356, 329, 315
See application file for complete search history.

(56) References Cited

U.S. PATENT DOCUMENTS

| | | | | |
|---|---|---|---|---|
| 9,632,920 B2 * | 4/2017 | Green | ................ | G06F 11/3688 |
| 2002/0194342 A1 * | 12/2002 | Lu | ............................ | H04L 29/06 |
| | | | | 709/227 |
| 2003/0126303 A1 * | 7/2003 | Kadakia | ............. | H04L 63/0442 |
| | | | | 719/313 |
| 2004/0088433 A1 * | 5/2004 | Kaler | .................. | H04L 63/0272 |
| | | | | 709/246 |
| 2004/0123159 A1 * | 6/2004 | Kerstens | ................. | H04L 29/06 |
| | | | | 726/12 |
| 2004/0177156 A1 * | 9/2004 | Hahn | .................. | G06F 17/3089 |
| | | | | 709/240 |
| 2005/0198388 A1 * | 9/2005 | Teodosiu | .............. | G06F 9/4416 |
| | | | | 709/245 |
| 2006/0218224 A1 * | 9/2006 | Agrawal | ........... | G06F 17/30578 |
| | | | | 709/201 |
| 2008/0256224 A1 * | 10/2008 | Kaji | .................... | H04L 65/1046 |
| | | | | 709/223 |

(Continued)

*Primary Examiner* — Thuong Nguyen
(74) *Attorney, Agent, or Firm* — Reising Ethington P.C.; James E Howard

(57) ABSTRACT

A private computer network associated with a vehicle data service center and a method of aggregating vehicle data using the private computer network. The method includes the steps of: receiving from a first subscriber vehicle one or more upload messages at a load balancing computer (LBC), wherein each of the one or more upload messages comprise unencrypted data; based on the unencrypted data, selecting at the LBC at least one telematics server of a telematics server farm to send the one or more upload messages; and providing the one or more upload messages to the at least one telematics server for upload message aggregation, wherein the LBC and the telematics server farm are associated with the private computer network.

16 Claims, 5 Drawing Sheets

(56) References Cited

U.S. PATENT DOCUMENTS

| | | | | |
|---|---|---|---|---|
| 2009/0059857 A1* | 3/2009 | Kim | ............... | H04W 28/08 |
| | | | | 370/329 |
| 2012/0108163 A1* | 5/2012 | Bai | ............... | H04L 12/1854 |
| | | | | 455/3.06 |
| 2013/0163508 A1* | 6/2013 | Yu | ............... | H04W 16/14 |
| | | | | 370/315 |
| 2013/0339540 A1* | 12/2013 | Sheer | ............... | H04L 65/608 |
| | | | | 709/231 |
| 2014/0006578 A1* | 1/2014 | Kohn | ............... | H04L 67/1027 |
| | | | | 709/223 |
| 2015/0074259 A1* | 3/2015 | Ansari | ............... | H04L 67/02 |
| | | | | 709/224 |
| 2015/0326698 A1* | 11/2015 | Mogul | ............... | G06F 9/547 |
| | | | | 709/217 |
| 2016/0098870 A1* | 4/2016 | Bergerhoff | ............... | G07C 9/00007 |
| | | | | 340/5.61 |

* cited by examiner

AGGREGATING VEHICLE-RELATED BIG DATA

TECHNICAL FIELD

The present invention relates to aggregating vehicle-related big data.

BACKGROUND

Big data pertains to data sets so large or complex that traditional data processing techniques are inadequate—e.g., processing exabytes of data and larger. Vehicles equipped with telematics devices have the capability of sending vehicle status reports to a vehicle call center which may analyze this data. However, as the number of telematics-equipped vehicles has increased in recent years, so has the volume of vehicle status reports—e.g., the volume is approaching or is already classifiable as 'big data.' Thus, in order to make use of the vast quantity of vehicle status reports being received, there is a need to provide a means for aggregating this data.

SUMMARY

According to an embodiment of the invention, there is provided a method of aggregating vehicle data using a private computer network associated with a vehicle data service center. The method includes the steps of: receiving from a first subscriber vehicle one or more upload messages at a load balancing computer (LBC), wherein each of the one or more upload messages comprise unencrypted data; based on the unencrypted data, selecting at the LBC at least one telematics server of a telematics server farm to send the one or more upload messages; and providing the one or more upload messages to the at least one telematics server for upload message aggregation, wherein the LBC and the telematics server farm are associated with the private computer network.

According to another embodiment of the invention, there is provided a method of aggregating vehicle data using a private computer network associated with a vehicle data service center. The method includes the steps of: receiving at a load balancing computer (LBC) a plurality of upload messages, wherein the plurality of upload messages are received from a plurality of subscriber vehicles, wherein each of the plurality of upload messages comprise a header, wherein at least some of the headers comprise an unencrypted portion; at the LBC, parsing the unencrypted portions of the plurality of upload messages for affinity data; and based on the affinity data: selecting at the LBC at least one telematics server associated with a telematics server farm; and providing a portion of the plurality of upload messages to the at least one telematics server for upload message aggregation.

According to another embodiment of the invention, there is provided a private computer network associated with a vehicle data service center adapted to aggregate vehicle data. The private computer network includes: a load balancing computer (LBC) comprising memory and one or more processors, wherein the memory stores instructions executable by the one or more processors; and a telematics server farm, comprising a plurality of telematics servers that include a first telematics server, wherein the LBC and telematics server farm are communicatively coupled, wherein the instructions include: processing a plurality of upload messages received from a plurality of subscriber vehicles; upon receipt of a first upload message of the plurality of upload messages, parsing the first upload message for unencrypted data; determining to send the first upload message to the first telematics server from among the plurality of telematics servers based on contents of the unencrypted data; and prior to sending the first upload message to the first telematics server, determining whether the first telematics server is experiencing a processing delay, wherein, when it is determined that the first telematics server is experiencing the processing delay, then determining a different telematics server to send the first upload message and sending the first upload message to the different telematics server, and wherein, when it is determined that the first telematics server is not experiencing the processing delay, then sending the first upload message to the first telematics server.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below pertain to aggregating, compiling, and/or utilizing large amounts of data received from vehicles associated with a common backend system. Modern vehicles can be configured to provide various types of vehicle information to the backend system which can use the information for various purposes (e.g., providing navigation information, telephony information, emergency assistance information, diagnostics information, infotainment information, etc.). For example, the backend system may receive diagnostic data in the form of a vehicle data upload (VDU) from a telematics-equipped vehicle. The VDU may be indicative of the vehicle's health or a need for vehicle maintenance. Upon receipt at the backend system, the backend system may determine whether to provide an operator of the vehicle an alert or notification (e.g., to have the vehicle engine checked). Diagnostic data is merely one type of VDU information; data carried in other VDUs could be related to non-diagnostic vehicle systems or subsystems, as will be explained below. As the number of telematics-equipped vehicles has increased in recent years, so has the amount of VDU information being sent to backend systems. Traditional data processing techniques are generally inadequate to process this voluminous amount of information or big data, as that term is understood by skilled artisans. The system and method described below include a load balancing computer and a telematics server farm configured to receive and aggregate vast quantities of vehicle data from telematics-equipped vehicles which are associated with a common backend system (or vehicle data service center) so that this vehicle data may be analyzed and used to improve services to the telematics-equipped vehicles.

Figure 1:
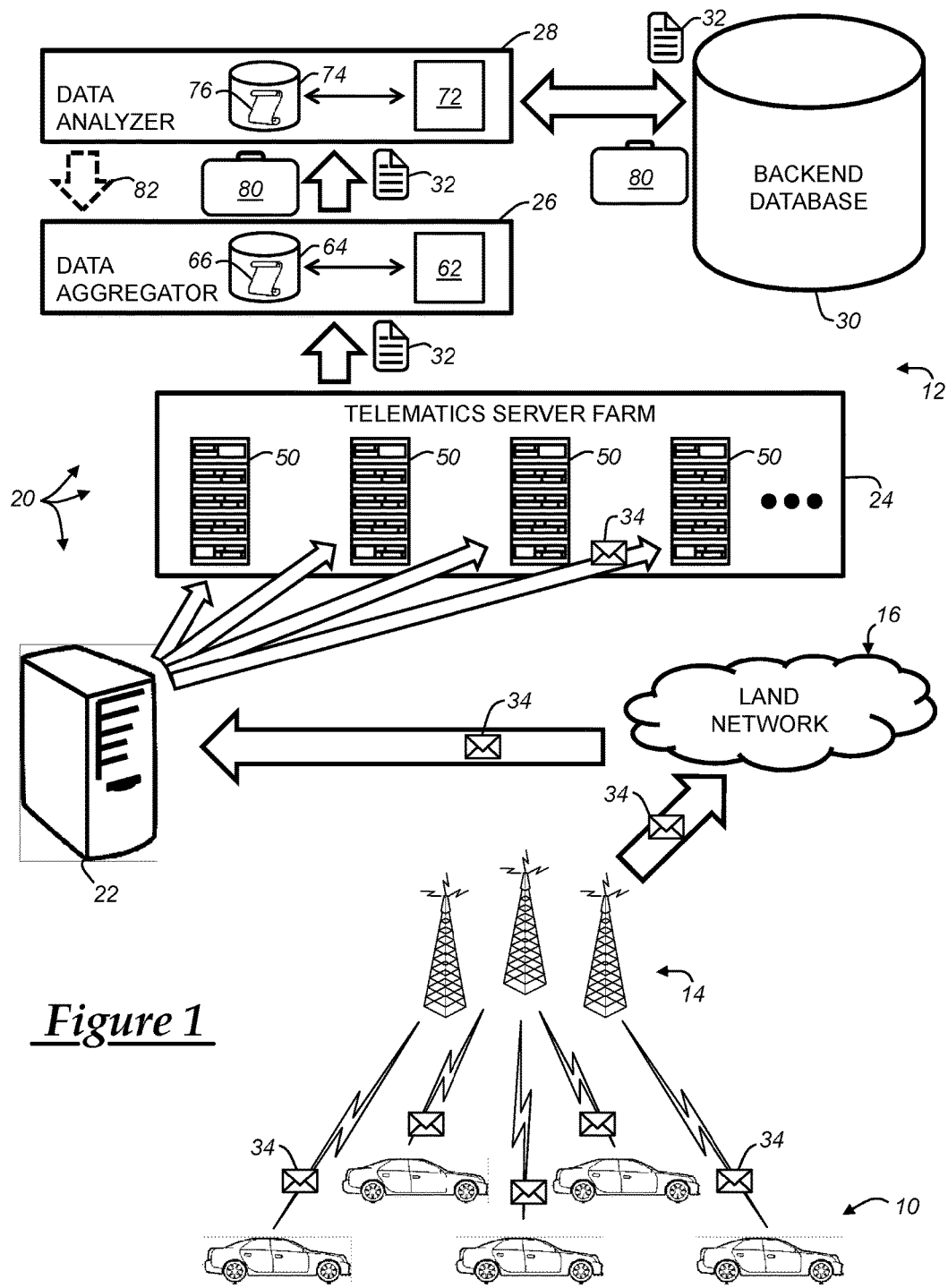
FIG. 1 is a block diagram depicting an embodiment of a data service center in communication with a plurality of vehicles, the data service center being configured to perform the method disclosed herein.

With reference to FIG. 1, there is shown an operating environment that comprises multiple vehicles 10 capable of remote communication with a data service center 12, one or more wireless carrier systems 14, a land communications network 16, and the data service center 12 (e.g., a common backend system to which all vehicles 10 send VDU information). The data service center 12 includes a private computer network 20—i.e., a number of computers privately-accessible to vehicles 10 via one or more gateway computers such as load balancing computer 22. The network 20 further comprises: a telematics server farm 24, data aggregator computer(s) 26, data analyzer computer(s) 28, and database(s) 30. (Only one load balancing computer 22, one data aggregator computer 26, one data analyzer computer 28, and one database 30 are shown in FIG. 1 and described below; however, it will be appreciated that each of these may represent a single device or multiple devices depending upon the particular implementation.) Also, it should be understood that the architecture of the system is not specifically limited to the operating environment shown here, and that the method(s) disclosed herein could be used with data service centers having different computers or other arrangements of computer systems.

It should also be appreciated that FIG. 1 illustrates a number of layers of abstraction associated with telecommunication and computing system functions. For example, the wireless carrier system 14 and land communications network 16 can be considered a physical layer (e.g., such as that in the Open Systems Interconnection or OSI model). Collectively, the load balancing computer 22, the telematics server farm 24, and the data aggregator computer 26 may be considered sub-layers of a presentation layer (see OSI model). As will be discussed below, each of these devices 22, 24, 26 may be parse and aggregate vehicle data for the data analyzer computer 28. And the data analyzer computer 28 and database 30 may be considered an application layer (see OSI model). This multi-layer representation is intended to demonstrate—at least in part—that aggregation of vehicle data is being accomplished closer to the physical layer. As will be explained below, with respect to big data, this equates to greater system performance and efficiency.

Vehicles 10 are depicted in the illustrated embodiment as passenger cars, but it should be appreciated that any other type of vehicle including motorcycles, trucks, sports utility vehicles (SUVs), recreational vehicles (RVs), marine vessels, aircraft, etc., could be used also. In addition, each vehicle 10 includes a telematics device or onboard communication system (not shown) which may comprise any suitable components for providing vehicle data upload files (or simply VDUs) 32 to the data service center 12. As will be explained below, the VDUs 32 may be broken into constituent components or upload messages 34. Each onboard communication system may include one or more of a cellular transceiver, a short-range wireless communication (SRWC) transceiver, a wired coupling or connector interface, or the like—each of the cellular transceiver, SRWC transceiver, or connector interface may be adapted to transmit VDUs to the data service center 12 via the wireless carrier system 14, the land communications network 16, or both. The cellular transceiver in vehicles 10 may be capable of communication according to one or more protocols (e.g., LTE, EVDO, CDMA, GPRS, EDGE, and the like). The SRWC transceiver may be capable of using one or more SRWC protocols (e.g., any of the IEEE 802.11 protocols, WiMAX, ZigBee™, Wi-Fi Direct, Bluetooth, Near Field Communication, and the like). And the interface of any physical connector/connection may be enable vehicle communication via a USB port, an Ethernet port, an OBDII port, and the like. In addition, as used herein, the term onboard communication system is inclusive of communication systems which utilize and/or interact with a vehicle operator's mobile device (e.g., cellular phone, Smart phone, tablet, etc.) to communicate vehicle data to the service center 12 as well. Such vehicle onboard communication systems—as well as their implementation for any suitable vehicle-to-vehicle (V2V) or vehicle-to-infrastructure (V2I) communication—are known in the art.

It should be appreciated that the onboard communication system of each vehicle 10 may provide a diverse range of other vehicle services as well; i.e., it may not only be configured to communicate with the data service center 12, but it also can be used (at least in part) to perform or provide services such as: turn-by-turn directions and other navigation-related services, airbag deployment notification and other emergency or roadside assistance-related services that are provided in connection with one or more collision sensor interface modules such as a body control module (not shown), diagnostic reporting using one or more diagnostic modules (not shown), infotainment-related services where music, webpages, movies, television programs, videogames and/or other information is downloaded or streamed by an infotainment module (not shown), real-time analytical services (e.g., pertaining to vehicle health or diagnostics, driver behavior, etc.), and the like. Further, the onboard communication system of each vehicle 10 may comprise any suitable hardware, software, or combination thereof to carry out at least a portion of the method described herein. For example, the onboard communication system of subscriber vehicles 10 may be configured in software, hardware, etc. to transmit push notifications or messages to the data service center 12. As used herein, a pushed message or push notification message is an upload message 34 which is transmitted by a subscriber vehicle 10 without a specific request from the data service center 12 (or more specifically, without a request from the LBC 22). Further, the contents of the upload messages 34 transmitted from each vehicle 10 may be associated with any of vehicle services executable by the onboard communication system.

In at least one embodiment, each of the vehicles 10 are subscriber vehicles. As used herein, a subscriber vehicle is a vehicle which provides some type of status data to the data service center 12, at least occasionally. Status data includes providing a VDU—e.g., having any suitable contents or subject matter. A subscriber vehicle may include vehicles in which a user of the vehicle is a party to a subscription agreement with a service provider associated with the data service center 12; however, this is not required. In some implementations, a user of the vehicle 10 has acknowledged or consented to sending or sharing vehicle data to the data service center 12 (e.g., at the time of vehicle purchase, lease, etc. or in accordance with a later agreement—in some instances, the user may do so to receive an indirect benefit of data service center efficiency); however again, this is not required. In at least one embodiment, the subscriber vehicles 10 have a common manufacturer or a common manufacturer association (e.g., related by brand, business division, or other business unit, etc.). In at least one embodiment, the subscriber vehicles provide information to the data service center 12 which is compiled and utilized to improve overall customer satisfaction, which will be described in the method below.

As mentioned above, the vehicles 10 may transmit vehicle data upload files (VDUs) 32 to the data service center 12. These VDUs 32 may be transmitted as packet data (e.g., TCP, UDP, or the like), as short message service (SMS) messages, or the like—and may be sent via cellular transmission, via SRWC (e.g., via infrastructure), via wireless or wired connection at a vehicle maintenance or service center, or in any other suitable manner. In addition, these VDUs 32 may be transmitted piece-meal as one or more fragments or upload messages 34; e.g., sending multiple upload messages 34 may be desirable when the amount of data in a single VDU 32 exceeds a desirable transmission size (e.g., exceeds a suitable packet size or SMS size). Each upload message 34 may include a fragment or portion of the VDU data in a body of the upload message 34. Thus, in these instances, the vehicle 10 (or onboard communication system therein) may divide the VDU 32 into pieces and send the entirety of the VDU 32 as multiple upload messages 34—and the data service center 12 can re-construct the VDU 32 using the multiple messages. This will be described in greater detail below. It should be appreciated that while dividing the VDUs 32 into pieces improves the transmission-ability (or transmission-capability) at the vehicle 10 or over the wireless carrier system 14 or land network 16, doing so imparts greater complexity at the data service center 12 where these constituent parts must be put back together (e.g., aggregated, compiled, organized, etc.).

At least some of the vehicles 10 may be configured to communicate privately with the private computer network 20 of the data service center 12. For example, the communication link between the vehicle(s) 10 and the data service center 12 could be connected via a dedicated link (e.g., using a private access point name or APN)—known only to the vehicles 10. Similarly, each vehicle 10 may have a unique identifier (e.g., an APN) known only to the data service center 12. In such examples, the vehicles 10 may have another APN which used for all other vehicle communications (e.g., a public APN). Communications carried out by each vehicle 10 via the private communication link may utilize at least some encryption techniques; e.g., at least a portion of the communications may be signed using a cryptographic key (e.g., a shared or private key associated with communications between the data service center 12 and that particular vehicle 10). However, as will be explained in greater detail below, in at least one embodiment, a portion of the upload messages 34 sent between the vehicle(s) 10 and the data service center 12 may not be encrypted. In some of these instances, the remainder of the upload message(s) 34 may be encrypted using a private key, a public key, or the like.

Wireless carrier system 14 is preferably a cellular telephone system. For example, in GSM systems, the wireless carrier system 14 may include cellular towers, base station subsystems, mobile switching systems, etc. Or for example, in LTE systems, the wireless carrier system may include cellular towers, evolved node Bs (eNBs), server gateways (SGWs), public data network or PDN gateways (PGWs), etc. Skilled artisans will appreciate that GSM systems and LTE systems include other elements, subsystems, or parts, and that the enumerated elements are merely examples. Further, GSM and LTE systems are merely examples of wireless carrier systems 14 and not intended to be limiting; other wireless carrier system implementations are contemplated as well.

Land network 16 may be a conventional land-based telecommunications network that is connected to one or more landline telephones and connects wireless carrier system 14 to data service center 12. For example, land network 16 may include a public switched telephone network (PSTN) such as that used to provide hardwired telephony, packet-switched data communications, and the internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 12 need not be connected via land network 16, but could include wireless telephony equipment so that it can communicate directly with a wireless network, such as wireless carrier system 14. However, in at least one implementation (as shown in FIG. 1), data service center 12 is connected to land network 16.

In general, the data service center 12 is designed to provide vehicles 10 with a number of different system back-end functions. For example, the data service center 12 may include a customer service or call center that includes an automated voice response system, a company of live advisors, or both. As will be described below, the data service center 12 may receive, send, store, aggregate, analyze, etc. data communicated to/from vehicles 10. The data may take the form of a vehicle data upload (VDU) 32 or any other suitable form. Non-limiting examples of the content of this data includes subscriber authentication information, vehicle identifiers, profile records, behavioral patterns, vehicle diagnostic (or health) data, vehicle usage data (driver behavior or other like), infotainment and entertainment data, navigation and/or traffic data, emergency assistance-related data, and other pertinent subscriber information.

Figure 2:
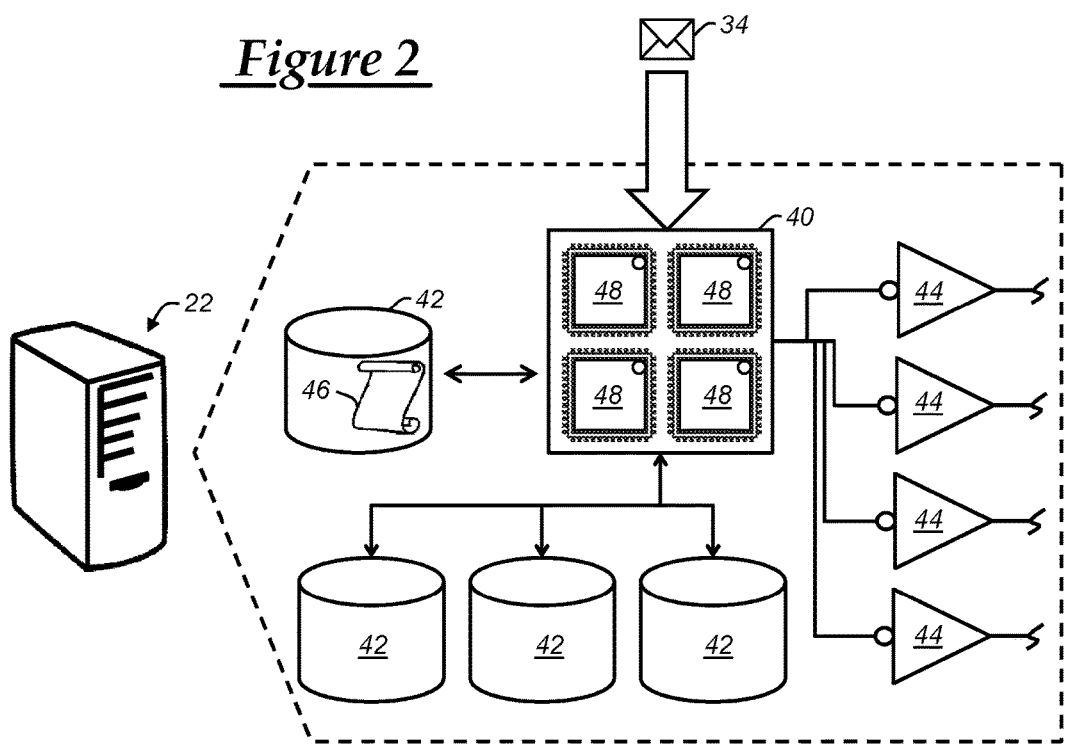
FIG. 2 is a schematic diagram of a load balancing computer of the data service center shown in FIG. 1.

The load balancing computer (LBC) 22 of the data service center 12 is also shown in FIG. 2. In the illustrated embodiment, the LBC 22 comprises a processor 40, several memory devices 42, and several buffers 44. The processor 40 may receive input data 34 via the land network 16 (or in some instances, directly from the wireless carrier system 14). Further, the processor 40 is coupled to both the memory device(s) 42 and buffer(s) 44. Processor 40 can be any type of device capable of processing electronic instructions including microprocessors, microcontrollers, host processors, controllers, vehicle communication processors, and application specific integrated circuits (ASICs). Processor 40 may be configured to execute various types of digitally-stored instructions 46, such as software and/or firmware programs stored in memory devices 42, which enable the LBC 22 to provide a number of load balancing services. For instance, processor 40 can execute programs or process data to carry out at least a part of the method discussed herein.

In one non-limiting example, processor 40 may be a multi-CPU control center that includes four or more separate CPUs 48 arranged to allow for parallel operation and to improve system control. In the case of multiple CPUs 48, each unit 48 may be assigned one or more tasks or routines associated with sorting and/or aggregating data (e.g., sorting and/or aggregating upload messages 34). In some implementations, one or more CPUs 48 may be assigned tasks associated with sorting upload messages 34 according to content of the message, while one or more other CPUs 48 may be assigned tasks associated with sorting upload messages 34 according to an identification of the sender or source of the message. This will be explained in greater detail below. Further, it should be appreciated that the illustrated processor 40 is merely an example. In other embodiments, LBC 22 may comprise multiple processors 40, and in at least one preferred embodiment, it does. In such implementations, one processor 40 may be dedicated to one aggregating task (e.g., sorting messages 34 from a group of vehicles 10), while another processor 40 could be dedicated to a different aggregating task (e.g., sorting messages 34 from another group of vehicles 10). These are merely examples, and other embodiments are possible.

Memory devices 42 may include any non-transitory computer usable or readable medium, which include one or more storage devices, storage articles, or databases. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. The illustrated implementation illustrates a single memory device 42 for storing instructions 46 and three other memory devices 42; however, this is merely an example. The number and arrangement of memory devices 42 may vary; further, digital instructions may be stored on more than one device 42 as well.

Buffers or queues 44 may be any temporary storage device (e.g., volatile memory such as RAM memory) and may serve as a holding location for upload messages 34 until the processor 40 can send the messages 34 to another portion of the private computer network 20 (e.g., the telematics server farm 24). As will be explained in greater detail below, in at least one implementation, upload messages 34 may be held by one or more buffers 44 until the LBC 22 determines a status of a server in the telematics server farm 24 or until the server is able/ready to receive the message 34. Buffers 44 may be implemented in a fixed memory location in hardware or by using a virtual data buffer in software, pointing at a location in the physical memory. In general, the hardware, software, or combination thereof to implement buffers 44 is known to skilled artisans and will not be elaborated further here.

As will be explained in the method below, the digital instructions 46 stored in memory device(s) 42 and executable by the processor 40 may be configured to sort upload messages 34 received from one or more vehicles 10. In at least one embodiment, the instructions 46 read an unencrypted portion of an upload message header, and based on unencrypted data in the header, the processor 40 (according to instructions 46) determines which server in the server farm 24 to send the upload message 34. This process can be repeated for multiple upload messages 34—and in many instances, may be performed simultaneously. In some embodiments, unencrypted data in the header includes a vehicle identifier (e.g., a telematics serial number, vehicle identification number (VIN), or the like) which the processor 40 (per instructions 46) can use to identify the source of the upload message 34. And in other embodiments, unencrypted data in the header includes application trigger identifier(s) which the processor 40 (per instructions 46) can use to identify the contents of the upload message 34—i.e., which vehicle subsystem or application triggered the VDU 32 (e.g., which system or subsystem triggered the burst or series of upload messages 34). In either instance, this unencrypted data may be used in the selection or determination of which server (in the server farm 24) to send the upload message 34. Of course, these are merely examples and other suitable sorting instructions may be used as well. These examples are elaborated more below.

Figure 5:
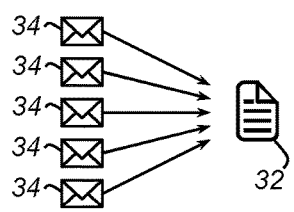
FIG. 5 is a block diagram illustrating a vehicle data upload (VDU) which is comprised of one or more upload messages.

The telematics server farm 24 illustrated in FIG. 1 comprises a plurality of servers 50. Each telematics server 50 may have similar hardware; therefore, only one will be described herein (see FIG. 3). Each server 50 may comprise one or more processors 52 and one or more memory devices 54. Each processor 52 may be arranged similar to processor 40, described above. For example, processor(s) 52 can be any type of device capable of processing electronic instructions including microprocessors, microcontrollers, host processors, controllers, vehicle communication processors, and application specific integrated circuits (ASICs). However, processor 52 may be configured to execute digitally-stored instructions 56 stored in memory device(s) 54—which may differ from instructions 46. Instructions 56 may be embodied as software and/or firmware programs which enable the server 50 to provide a number of aggregating services which, when executed, carry out at least a part of the method discussed below. For example, the digital instructions 56 stored in memory device(s) 54 and executable by the processor 52 may be configured to aggregate upload messages 34 received from the LBC 22. FIG. 5 illustrates an aggregation of multiple upload messages 34 into a single vehicle data upload (VDU) 32, and an example of this is provided in the method described below. Further, instructions 56 may enable processor 52 to extract the contents or content data from the body of each message 34 and assemble or arrange the contents into a comprehensible format.

Figure 3:
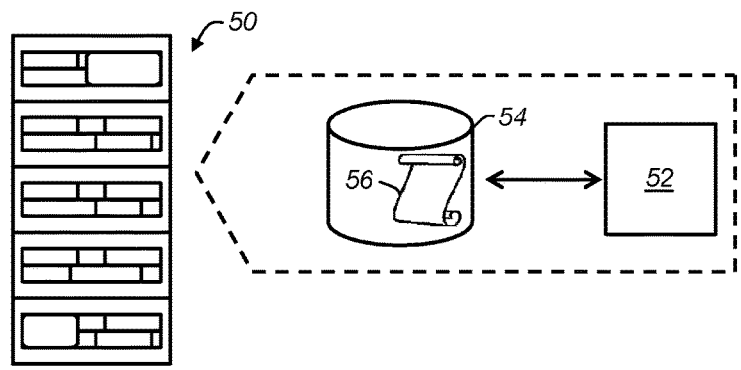
FIG. 3 is a schematic diagram of a telematics server of the data service center shown in FIG. 1.

Memory device(s) 54 may be similar to memory devices 42, described above except that device(s) 54 may store different data and/or digital instructions. For example, memory device(s) may be any non-transitory computer usable or readable medium, which include one or more storage devices, storage articles, or databases. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In FIG. 3, one memory device 42 is shown; however, each server 50 could comprise multiple memory devices 54 instead.

In one embodiment, each server 50 is identical and configured similarly. For example, the instructions 56 stored on each server 50 could be identical so that each server can execute aggregating instructions similarly. In this manner, if one server 50 experiences a processing delay, one or more other servers 50 could assume its tasks or responsibilities. As used herein, a processing delay includes any server-related delay, server-related malfunction, issue, or problem, and/or any server-related inoperability—all of which would tend to slow the processing capability or capacity of the respective server 50 to less than a predetermined or comparative threshold. A predetermined threshold is an objective value (e.g., a percentage) and includes a threshold based on remaining CPU or processing capability (e.g., in lieu of currently processed tasks, routines, programs, etc.). A comparative threshold can be a subjective value based on relative CPU or processing capability—when compared with other servers 50 in the server farm 24. Thus for example, in at least one embodiment, a server could be operating below the predetermined threshold but higher with respect to a comparative threshold—in such instances, the server may not be considered to be experiencing a processing delay. Continuing with the example, if the same server was operating below both a predetermined threshold and a comparative threshold, then the server may be experiencing a processing delay.

In other embodiments, one or more servers 50 could be dedicated or tagged (e.g., earmarked) for receiving certain upload messages 34—e.g., based on message content or a source of the message 34. For example, one or more servers 50 could receive upload messages 34 from the LBC 22 regarding a first group of vehicles 10, while one or more different servers 50 could receive upload messages 34 from the LBC 22 regarding a second group of vehicles 10, etc. Or for example, one or more servers 50 could receive upload messages 34 from the LBC 22 when the upload messages are associated with a diagnostic report or function determined at the vehicles 10. Or for example, one or more different servers 50 could receive upload messages 34 from the LBC 22 when the upload messages are associated with a software version of the onboard communication systems of the vehicles 10. As discussed more below, the LCB 22 may be responsible for sorting these different categories of upload messages 34 and providing the messages 34 to the various servers 50 accordingly.

In other embodiments, the LBC 22 may determine an operational status of each server 50 so that aggregating tasks or responsibilities of the respective servers 50 can be divided in the event of a processing delay at one or more of the servers 50. Thus, when the servers 50 are tagged for receiving messages 34 based on a category such as content, source, etc. in at least one preferred embodiment, multiple servers 50 are associated with each category—in this manner, in the event of a processing delay, another similarly tagged server 50 (in the same category) might assume the responsibilities of the server experiencing a processing delay. Thus regardless of the configuration of the servers 50, it is contemplated that at least one other server 50 may assume the tasks or responsibilities of each server 50—so that the LBC 22 may make server selection adjustments and balance the upload message traffic between different servers 50.

FIG. 1 illustrates that the data aggregator computer 26 and the data analyzer computer 28 each may comprise processors 62, 72, memory devices 64, 74, and digitally stored instructions 66, 76, respectively. For the sake of brevity, the processors 62, 72 and memory devices 64, 74 will not be re-described herein. It should be appreciated that each of these devices 62-64 and 72-74 may be embodied according to one or more of the processor and memory device implementations described above with respect to the LBC 22 and/or servers 50. Accordingly, each of the processors 62, 72 may execute instructions 66, 76 stored on memory devices 64, 74 (respectively) to carry out at least a portion of the method described herein. However, instructions 66 and instructions 76 may differ in configuration, purpose, and function.

Figure 6:
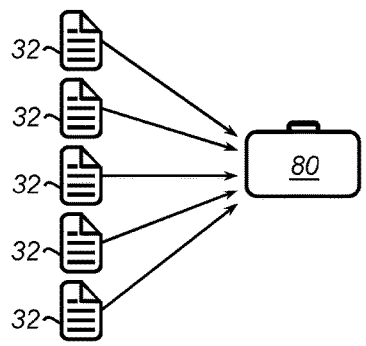
FIG. 6 is a block diagram illustrating a data compilation which is comprised of one or more VDUs.

In at least one embodiment, instructions 66 may group one or more VDUs 32 from the server farm 24 according to suitable affinities—e.g., aggregating the VDUs 32 in preparation for analysis by the data analyzer computer 28. For example, FIG. 6 illustrates that multiple VDUs 32 may be aggregated into a data compilation or VDU affinity group 80 (e.g., by analogy, if a VDU 32 is a file, affinity group 80 could be akin to a collection of files; however, this example is intended only to illustrate an affinity grouping; other suitable affinity groupings or representations are contemplated also). Non-limiting examples of VDU aggregation into affinity groups 80 include: aggregating VDUs 32 according to the specific vehicle 10 from which the VDUs 32 were received, aggregating VDUs 32 according to a predetermined quantity or selection of vehicles 10 from which the VDUs 32 were received, aggregating VDUs 32 according to vehicles 10 within a specific or general geographic location or region at the time of the upload message(s) 34, aggregating VDUs 32 according to a type or category of diagnostic message or trouble code (e.g., DTC), aggregating VDUs 32 according to a software version associated with the vehicles 10 (e.g., a software version associated with each of the onboard communications systems), etc. Again, these are merely examples. The manner in which data may be prepared and aggregated for analysis by the data analyzer computer 28 may be selected or configured in accordance with system architects and other skilled artisans who are familiar with the type and/or need for particular vehicle analytics.

Furthermore in executing instructions 66, processor 62 may group VDUs 32 according to predetermined or preconfigured affinities. Or the instructions 66 may permit processor 62 to accept input or feedback 82 from data analyzer computer 28—e.g., providing regular or intermittent real-time changes to desired affinities. In this latter instance, the data aggregator computer 26 may aggregate—at least temporarily—the VDUs 32 into different affinity groups 80 and thereafter provide these different affinity groups 80 to computer 28. Again, this is merely an example; other implementations by systems architects are contemplated also.

Instructions 76 may conduct affinity analysis of the VDUs 32, the VDU groups 80, or both. For example, the data analyzer computer 28 may process VDUs 32, VDU groups 80, or both to uncover: patterns associated with vehicles 10 or patterns associated with users of vehicles 10; correlations based on geography, vehicle make, vehicle model, vehicle user demographics, vehicle hardware and/or software (e.g., including software versions), vehicle diagnostics, just to name a few non-limiting examples; customer preferences and trends (e.g., data download, upload trends, vehicle hardware/software usage by users, etc.); and/or marketing or other useful business information. System architects and other skilled artisans will appreciate suitable types of analyses, suitable timing and durations of such analyses, suitable implementation of such analyses, and the like. It will be appreciated that big data analytics using instructions 76 may be used to improve the vehicle experience of subscriber vehicles 10, improve operational efficiency of the data service center 12, generate marketing revenue, and/or provide the data center 12 with certain competitive advantages over other backend systems. The examples of the analytical instructions 76 are merely exemplary; other implementations are contemplated herein.

The big data or backend database 30 shown in FIG. 1 generally may be any suitable type or collection of memory devices (similar as those described above); e.g., database 30 may comprise a non-transitory computer usable or readable medium. In at least one embodiment, the scale or magnitude of the memory device(s) of database 30 may be larger than any of the previously described memory devices (e.g., larger than devices 42, 64, or 74); e.g., tens, hundreds, or even thousands of time larger. The database 30 may store historical VDU data and VDU grouped data, historical analyses of VDU data and VDU groupings, etc. Further, the database 30 may be accessible by the data analyzer computer 28—e.g., for comparison of present or current data versus historical data. The duration in which database 30 stores such data, the specific types of data stored therein, etc. will be appreciated by skilled artisans.

A method will be described below using the private computer network 20 of the data service center 12 wherein the previously described elements 22, 24, 26, 28, and 30 work in sequence and/or concert with one another to carry out the method. As illustrated in FIG. 1, upload messages 34 may be transmitted via any suitable communication medium to the load balancing computer (LBC) 22 which may determine which of the one or more suitable servers 50 in the server farm 24 to send the upload messages 34. At the server farm 24, the upload messages 34 may be compiled into VDUs 32 and sent to the data aggregator computer 26. At the data aggregator computer 26, the VDUs 32 further may be aggregated into VDU groups 80; then, the VDUs 32 and/or VDU groups 80 may be forwarded to the data analyzer computer 28. At the analyzer computer 28, the data 32, 80 may be analyzed and any suitable output may be provided. VDUs 32, the groups 80, the analytical output of data analyzer computer 28, or any combination thereof may be stored for any suitable duration of time at the database(s) 30. This process may be continuous. Further, the LBC 22 may be configured to optimize data traffic so that the data analyzer computer 28 receives VDUs 32 and VDU groups 80 closer to real-time—e.g., in other words, the LBC 22 may balance the data traffic load between the servers 50 in order to maximize aggregation speed and efficiency. As will be discussed in the method which follows, the structure of the private computer network 20—as well as the configurations and instructions of the respective computers/computing systems—is adapted to push the aggregation of big data closer to the edge of the private computer network 20; i.e., adapted to push the aggregation of big data closer to the LBC 22 thereby ultimately enabling more efficient and faster data analytics.

Method—

Figure 7A:
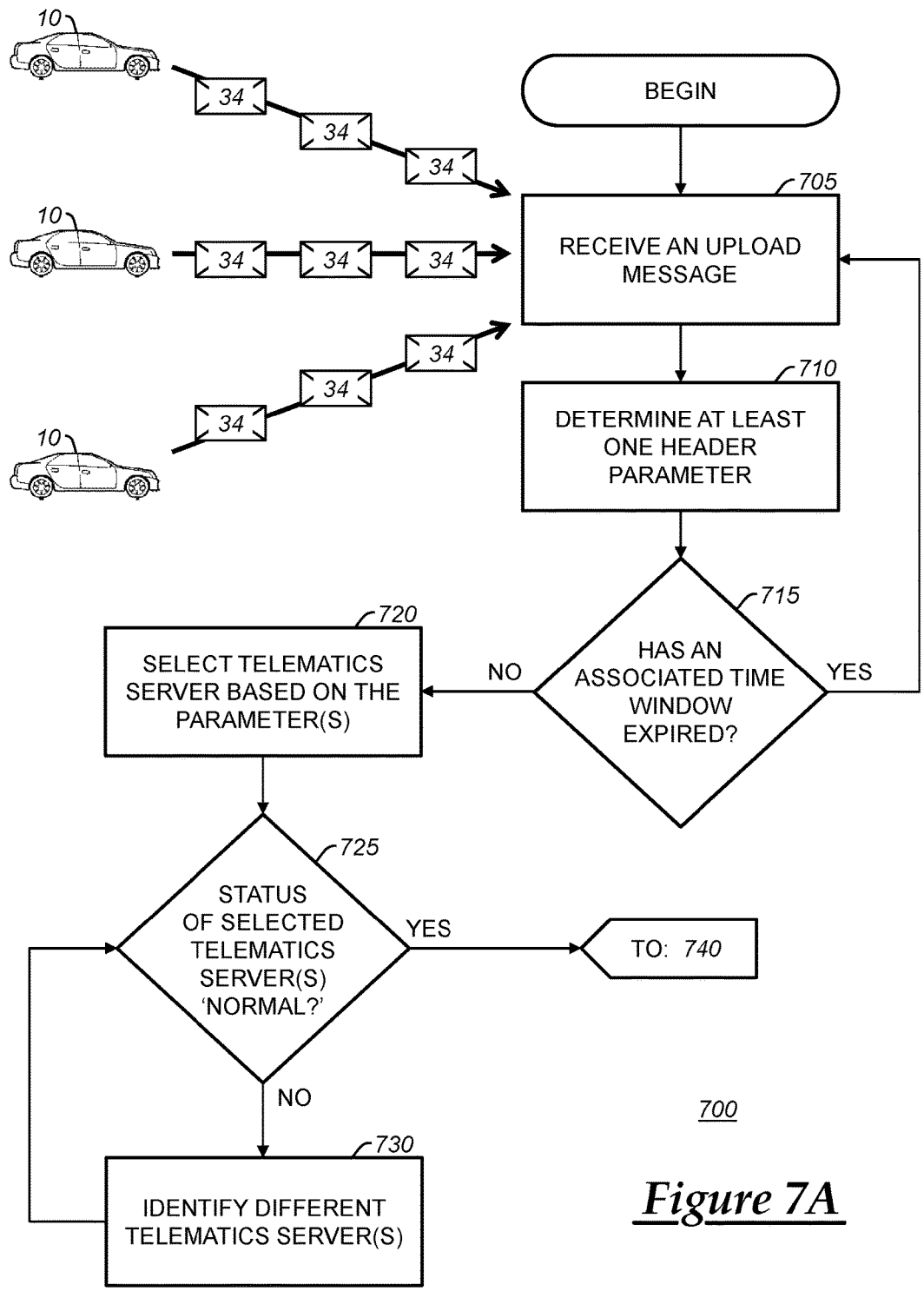
FIGS. 7A-7B is a flow diagram of a process of aggregating vehicle data received via upload messages from a plurality of vehicle subscribers.
Figure 7B:
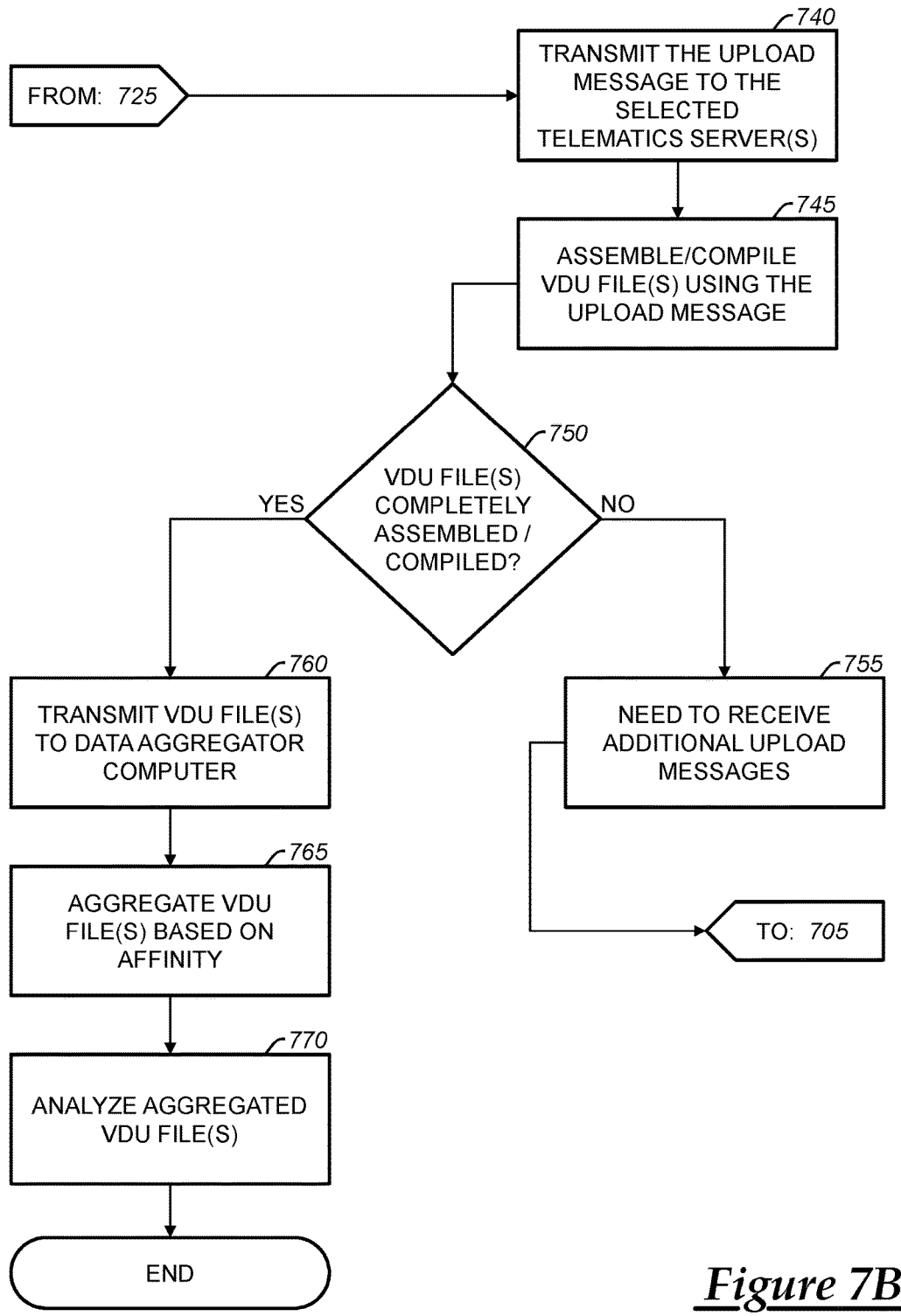

Turning now to FIGS. 7A-7B, there is shown a method 700 of aggregating vehicle data using the private computer network 20 associated with data service center 12. The method begins with step 705 wherein the load balancing computer (LBC) 22 receives an upload message 34. For illustrative purposes, method 700 describes a single upload message. However it should be appreciated that in practice, the LBC 22 could receive millions of upload messages 34 simultaneously or nearly so. In step 705, the message 34 may be received via any suitable means (e.g., via cellular transmission, SRWC communication (e.g., via infrastructure), via a vehicle service center, etc.). In at least one embodiment, the upload message 34 is received cellularly via the onboard communication system of one of the subscriber vehicles 10 (e.g., a packet data message sent via the wireless carrier system 14 and land network 16). This may be a result of the vehicle 10 pushing the upload message 34 to the LBC 22 (e.g., a push notification message).

Figure 4:
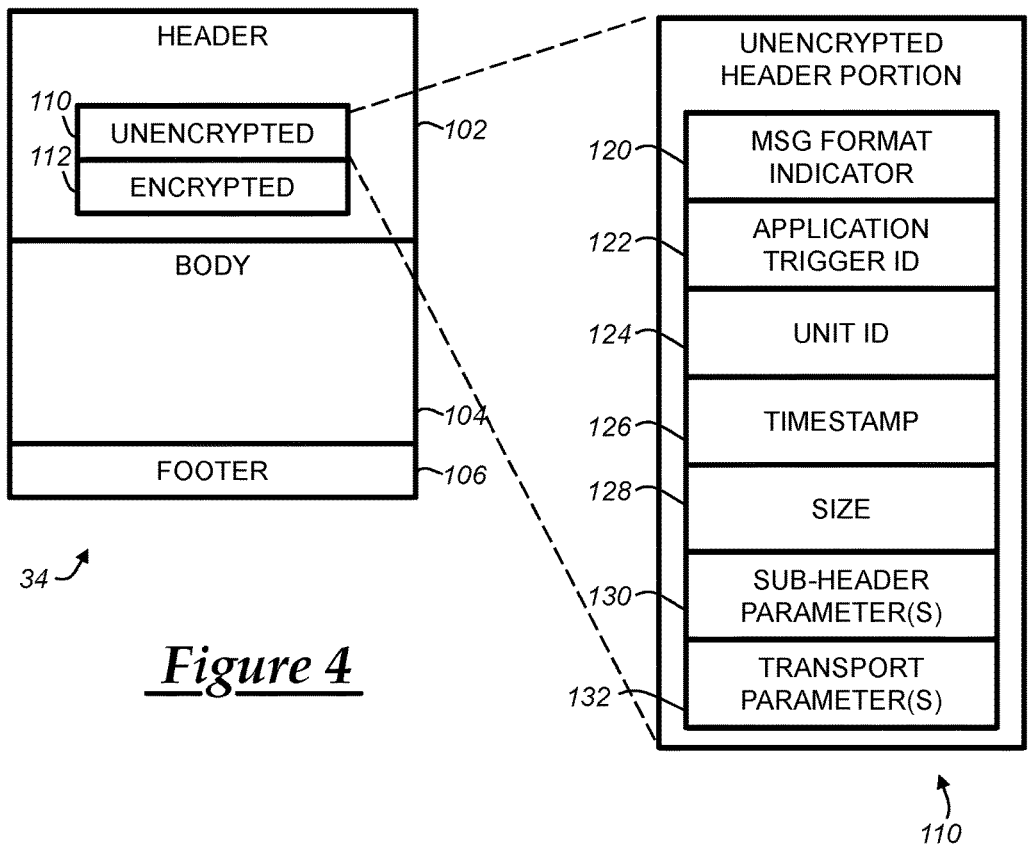
FIG. 4 is a block diagram illustrating exemplary components of an upload message.

Once the upload message 34 is received at the LBC 22, in step 710, the LBC determines (e.g., parses, reads and interprets) at least one parameter of a header 102 of the upload message 34; see FIG. 4. FIG. 4 illustrates a format of one packet data embodiment of the upload message 34. Again, it should be appreciated that packet data is merely one type of upload message 34 (e.g., as discussed above, the message 34 could be an SMS message or any other suitable type of digital transmission). The upload message 34 in FIG. 4 comprises the header 102, a body 104, and a footer 106. In at least one embodiment, the header 102 includes at least a portion 110 which is unencrypted; in some embodiments, the header 102 further may comprise an encrypted portion 112 as well (however, this is not required). The unencrypted portion 110 may be a transmission control protocol/user datagram protocol (or TCP/UDP) header and may comprise one or more header parameters 120-132. In FIG. 4, examples of unencrypted header parameters 120-132 are illustrated; however, these are merely examples. In some embodiments, a single unencrypted header parameter may be present (e.g., one of parameters 120-132). And in still other embodiments, there may be unencrypted header parameters different than those shown and described herein—or more or fewer parameters than are shown in FIG. 4. Non-limiting examples of unencrypted header parameters 120-132 include: a message format indication parameter 120, an application trigger identification parameter 122, a unit identification parameter 124, a timestamp parameter 126, a message size parameter 128, one or more sub-header parameters 130, and one or more transport or transport protocol parameters 132. The message format indication parameter 120 may provide instructional information for the server(s) 50—e.g., how to parse the body 104 of message 34. Additionally, the message format indication parameter 120 could identify the software version used by the onboard communication system of the vehicle 10 (from which the message 34 was sent). The application trigger identification parameter 122 may indicate a purpose of the message or use case—e.g., whether the message 34 pertains to diagnostics, driver behavior, etc. In some implementations, parameter 122 may indicate whether data is associated with a particular module in the respective vehicle 10 (e.g., a body control module, a navigation unit, etc.). The unit identification parameter 124 may identify the particular vehicle 10 from which the message 34 was sent. In some implementations, this may be a vehicle identification number (VIN) or a serial number or APN identifying the onboard communication system of the particular vehicle 10. These are merely examples; other examples also exist (e.g., an identifier associated with a subscriber identity module (SIM) such as an international mobile subscriber identity (or IMSI)). The timestamp parameter 126 includes any indication of a time associated with when the message 34 was transmitted; e.g., an actual time of transmission from vehicle 10. This is merely an example of a time parameter; other time parameters could also be used. The size parameter 128 may indicate the size of the particular upload message 34 (or e.g., the size of the body 104 of the message 34) and/or the size of the entire VDU 32 (to which the message 34 belongs). The sub-header parameter(s) 130 may indicate additional information associated with the type and sequence of the upload messages 34 which comprise the VDU 32. For example, one sub-header parameter 130 may be an index value which allows a server 50 (in the server farm 24) to re-assemble the message 34 in a sequential order with other constituent members of the particular VDU 32. For illustrative purposes only, consider a burst of five upload messages having index values of 001, 002, 003, 004, and 005 where the particular upload message 34 (in step 710) has an index value of 004. Server 50 might re-assemble the particular upload message between the constituent messages having indices of 003 and 005 (once the server 50 received those messages as well). This of course is merely an example to illustrate one implementation of the sub-header parameter 130 (e.g., and how a series or burst of upload messages 34 could be re-assembled later at server 50); other implementations also are contemplated. And the transport parameter(s) 132 could identify the source internet protocol (IP) address and port number (and/or the destination IP address and port number), as well as any other suitable transport protocol information.

Next in step 715, before the upload message 34 is sent to one or more server(s) 50, the LBC may determine (e.g., parse, read, and interpret) the timestamp parameter 126 of the upload message 34. More specifically, in step 715, the LBC 22 may determine whether an associated time window for the upload message 34 has expired. In one embodiment, the LBC 22 may store a predetermined time period or expiration window, compare the timestamp parameter 126 with this expiration window, and determine whether or not the upload message 34 has expired. If the upload message has expired, then the LBC 22 may ignore and/or discard the message 34, and the method 700 may loop back to step 705. If the upload message has not expired, then the method may proceed to step 720. The expiration window may be associated with a duration of time which the LBC 22 expects to receive an entire VDU 32 sent from the vehicle 10. For example, when a vehicle 10 transmits a VDU in a burst of upload messages 34, this may occur relatively quickly (e.g., within seconds or even a few minutes). In some instances, the LBC 22 may not receive all of the upload messages for several additional minutes—particularly if there are transmission delays. Thus in at least some embodiments, the expiration window could be 15 minutes, 20 minutes, or even 30 minutes. In each of these examples, the duration of the expiration window accounts for vehicle transmission time, delays or lag in the carrier system 14 or land network 16, and sometimes several or more additional minutes (e.g., a time or delay tolerance). Thus for illustrative purposes only—and assuming the expiration window is 30 minutes—the LBC 22 may determine that the value of the timestamp parameter 126 is 2015-10-31, 13:10:59 and compare that to a clock value at the LBC. If the LBC clock value is less than or equal to 2015-10-31, 13:40:59 (i.e., 30 minutes from the time of transmission), then the LBC 22 determines the message 34 has not expired and proceeds to step 720. And if the LBC clock value is greater than 2015-10-31, 13:40:59, then the LBC 22 determines the message 34 has expired, ignores and/or discards the message 34, and loops back to step 705. In this manner, messages 34 which may no longer be relevant to real-time analytics may be removed from the big data aggregation process—thereby improving system efficiency.

Next in step 720, the LBC 22 may determine one or more servers 50 at the server farm 24 to send the unexpired upload message 34. As discussed above, this selection may depend upon one or more of the unencrypted header parameters 120-132. For example, if the LBC 22 is sorting upload messages based on source, the LBC 22 may determine the server(s) 50 based on the unencrypted unit identification parameter 124. Or for example, if the LBC 22 is sorting upload messages based on content, the LBC 22 may determine the server(s) 50 based on the unencrypted application trigger identification parameter 122. Or for example, if the LBC 22 is sorting upload messages based on software version (of the respective onboard communication systems), the LBC 22 may determine the server(s) 50 based on the unencrypted message format indicator 120. Or if the LBC 22 is sorting upload messages based on the transport parameter(s), the LBC could determine the server(s) 50 based on the source IP address and port and/or the destination IP address and port. In some implementations, more than one parameter 120-132 could be considered in determining which server(s) to send message 34. Thus, these sorting means may be used singly or in combination with one another. And these are merely a few examples to illustrate one aspect of how the LBC 22 may select a server 50. As described below in step 725 below, LBC 22 also may consider which server(s) 50 are experiencing lower data traffic volumes.

In at least one embodiment, the LBC 22 uses only the unit identification parameter 124 and/or the timestamp parameter 126. In at least one other embodiment, the LBC 22 uses at least one of: the unit identification parameter 124, the timestamp parameter 126, and the transport parameter(s) 132. And in at least one other embodiment, the LBC 22 uses at least one of: the unit identification parameter 124, the timestamp parameter 126, the transport parameter(s) 132, the message format indication parameter 120, and application trigger identification parameter 122.

In step 725, the LBC 22 determines status of the selected server(s) 50—e.g., whether the selected server(s) 50 are operating in a normal mode or an abnormal mode. If the server(s) 50 are operating in a normal mode, then the method proceeds to step 740 (FIG. 7B). However, if the selected server(s) 50 are operating in an abnormal mode, then the method proceeds to step 730 (e.g., selecting a different server 50 or at least considering a different server). The normal mode 50 may be indicative of the server(s) 50 experiencing no processing delay(s). And the abnormal mode may mean that the server(s) 50 are experiencing processing delays (or even entirely inoperable).

In step 730, the LBC may identify a different server 50—e.g., at least one alternative server to which to send the upload message 34. The different server 50 may be identified or determined for reasons similar to those in step 720. For example, the different server 50 may be identified as processing similarly categorized upload messages 34. Following step 730, the method 700 loops back to step 725 and determines the status of the newly selected server(s) 50. In some implementations, the newly selected server(s) 50 may be in a normal mode, in which case the method proceeds to step 740. However, if the newly selected server(s) 50 are in an abnormal mode as well, the LBC 22 may either proceed to step 730 (selecting different server(s) 50) or make a comparison between the two or more of the previously selected servers 50 (e.g., to determine whether one or more are better suited than the others for processing the particular upload message 34). This may include the LBC 22 determining the comparative threshold discussed above. Further, this loop between steps 725 and 730 may be iterative. For example, due to abnormal modes of multiple servers 50, the LBC 22 could select a number of servers 50 (all which may be running in abnormal modes) and ultimately choose one of the better (or best) suited candidates. For example, this iterative determination may occur typically during period of high traffic volume, maintenance performed on servers 50, or when multiple servers 50 are experiencing processing delays. In some circumstances, the method may even loop back to step 720 and select a telematics server based on other parameter(s). It should be appreciated that steps 715, 720, 725, and 730 are load-balancing steps; i.e., the LBC 22 may determine a most efficient server 50 to further process the particular upload message 34.

In step 740 (FIG. 7B), the LBC 22 transmits the upload message 34 to the determined or ultimately selected server(s) 50. In at least one embodiment, this is via a wired connection in the private computer network 20 (e.g., via a bus or the like); however, this is not required.

In step 745, the selected server 50 in the server farm 24 may begin to compile or assemble the VDU 32 using the upload message 34. For example, continuing with the example above, if the particular upload message is 004—and presuming the server 50 previously received messages 001, 002, 003 and 005—then server 50 may finish compiling the VDU 32 using this last message (i.e., 004). The server 50 may not only aggregate the upload messages (001, 002, 003, 004, and 005) according to the VDU 32; the server 50 may extract the contents of each upload message 34 and assemble the constituent parts into a whole—i.e., a whole VDU file.

As previously discussed, the body of each upload message 34 may be at least partially encrypted; therefore, server 50 may decrypt the contents of each message 34 and assemble the unencrypted contents to re-assemble the whole VDU file. In other implementations, the decryption may occur at the data aggregator computer 26.

In step 750, selected server 50 may determine whether the entire VDU 32 is assembled. If the VDU is not complete, the server 50 may determine it needs to receive additional upload messages 34 (step 755) and loop back to step 705. If the method loops back to step 705, it should be appreciated that the sequence of the upload messages which constitute the whole VDU may be received in any order and at irregular intervals. Further, while one upload message 34 is being processed (associated with a particular VDU 32), another related upload message 34 may be received at LBC 22 before the first message is processed in step 750. Thus, the process may be generally continuous and overlapping. If in step 750 the server 50 determines that the VDU 32 is whole (all upload messages are compiled), then the method 700 may proceed to step 760.

In step 760, the server 50 transmits the particular VDU 32 to the data aggregator computer 26. Upon receipt in step 765, the aggregator computer 26 aggregates VDUs 32 according to one or more suitable affinities (e.g., as discussed above). In general, skilled artisans and system architects will appreciate which affinities are appropriate or desirable to aggregate. In at least one embodiment, the data aggregator computer 26 compiles multiple VDUs 32 together into a VDU affinity group 80 and provides this group 80 to the data analyzer computer 28 using the private computer network 20 (e.g., provides it via a data bus). In other embodiments, the data aggregator computer 26 provides multiple VDUs 32 to the data analyzer computer 28 in addition to or in lieu of the affinity groups 80. The aggregated VDUs 32 may be from the same vehicle 10, but more likely, from other subscriber vehicles 10. Similarly, it many implementations, the affinity groups 80 are from multiple vehicles 10 (however, this is not required). Once the VDUs 32 are aggregated, the method 700 proceeds to step 770.

In step 770 which follows, the data analyzer computer 28 analyzes the VDUs 32, the affinity groups 80, or both. Similar to step 765, skilled artisans and system architects will appreciate appropriate or desirable analyses which may be performed by the analyzer computer 28. These analyses may be stored in database 30. Further, the analyzer computer 28 may provide VDUs 32 and/or affinity groups 80 to the database 30 for storage as well. Following step 765, the method 700 ends.

Thus, there has been described a data service center which comprises a private computer network for using vehicle data received from one or more subscriber vehicles. The computer network includes a gateway computer or load balancing computer which parses and sorts the vehicle data and determines which of a plurality of telematics servers to send the particular vehicle data. The computer network may further aggregate the data in preparation for an even higher layer to perform analytics. The computer network is configured so that more aggregation is performed closer to a physical layer (e.g., a wireless carrier system and/or land communication network). In this manner, the data service center performance and efficiency may be improved.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of aggregating vehicle data using a private computer network associated with a vehicle data service center, comprising the steps of:

receiving at a load balancing computer (LBC) a plurality of upload messages from a first subscriber vehicle, wherein each of the plurality of upload messages includes unencrypted data and an encrypted message body;

at the LBC, obtaining affinity data from the unencrypted portions of the plurality of upload messages, wherein the affinity data is data that indicates predetermined similarities between messages;

based on the affinity data, selecting a first telematics server associated with a telematics server farm, wherein the selection of the first telematics server is made at the LBC using the affinity data that was obtained from the unencrypted portions of the plurality of upload messages;

for each upload message of the plurality of upload messages:

selecting at least one telematics server of a telematics server farm to send the upload message, wherein the at least one telematics server is selected by the LBC based on at least some data included in the unencrypted data;

determining whether the upload message has expired based on a timestamp parameter of the upload message, wherein the determination of whether the upload message has expired is made at the LBC;

when the LBC determines that the upload message has expired, then ignoring the upload message so that the upload message is not provided to the at least one telematics server for upload message aggregation; and when the LBC determines that the upload message has not expired, providing the upload message to the at least one telematics server for upload message aggregation;

wherein the at least one telematics server is configured to:

decrypt the encrypted message body to obtain decrypted data for each of the provided upload messages;

assemble the decrypted data for each of the provided upload messages into a single vehicle data upload (VDU);

determine whether the single VDU is completely assembled;

when the single VDU is not completely assembled, wait for additional upload messages from the LBC; and when the single VDU is completely assembled, provide the single VDU to a data aggregator computer, wherein the LBC and the telematics server farm are associated with the private computer network.

2. The method of claim 1 wherein the data aggregator computer is associated with the private computer network.

3. The method of claim of claim 2, further comprising:
at the data aggregator computer, aggregating the single VDU with one or more other VDUs based on an affinity; and
providing the aggregated data to a data analyzer computer configured to determine analytics based on the aggregated data.

4. The method of claim 1, wherein the timestamp parameter is included in a header of the upload message and is unencrypted.

5. The method of claim 1, wherein selecting the at least one telematics server further comprises:
for each of the plurality of upload messages which have not expired, determining at the LBC at least one of: a source associated with the upload message, a use case associated with the upload message, or a software version associated with an onboard communication system that sent the upload message; and
providing the plurality of upload messages to the at least one telematics server based on the source, the use case, or the software version.

6. The method of claim 1, wherein selecting the at least one telematics server further comprises:
determining at the LBC a status of a first telematics server of the telematics server farm; and
when the status of the first telematics server indicates a processing delay, then providing the plurality of upload messages to a second telematics server for upload message aggregation.

7. A method of aggregating vehicle data using a private computer network associated with a vehicle data service center, comprising the steps of:
receiving at a load balancing computer (LBC) a plurality of upload messages, wherein the plurality of upload messages are received from a plurality of subscriber vehicles, wherein each of the plurality of upload messages comprise a header and an encrypted message body, wherein at least some of the headers comprise an unencrypted portion;
at the LBC, obtaining affinity data from the unencrypted portions of the plurality of upload messages, wherein the affinity data is data that indicates predetermined similarities between messages;
based on the affinity data, selecting a first telematics server associated with a telematics server farm, wherein the selection of the first telematics server is made at the LBC using the affinity data that was obtained from the unencrypted portions of the plurality of upload messages;
in response to the selecting step, determining whether the first telematics unit is experiencing processing delays;
when it is determined that the first telematics unit is not experiencing processing delays, providing a portion of the plurality of upload messages to the first telematics server for upload message aggregation;
when it is determined that the at least one telematics unit is experiencing processing delays, selecting a second telematics server associated with the telematics server farm and providing the portion of the plurality of upload messages to the second telematics server for upload message aggregation, the second telematics server being separate than the first telematics server; and
at the first and second telematics server:
assembling at least some of the plurality of upload messages into a vehicle data upload (VDU);
determining whether the VDU is completely assembled based on information contained in the at least some of the plurality of upload messages; and
when it is determined that the VDU is completely assembled, providing the VDU to a data analyzer computer, the data analyzer computer being separate from the LBC, the first telematics server, and the second telematics server.

8. The method of claim 7, wherein the affinity data is associated with at least one of a message format indication parameter, an application trigger identification parameter, a unit identification parameter, a timestamp, a message size parameter, one or more sub-header parameters, and a transport parameter.

9. The method of claim 7, further comprising:
prior to providing the VDU to the data analyzer computer, providing the VDU to a data aggregator computer, wherein the data aggregator computer compiles the VDU with other VDUs into an affinity group;
providing the affinity group to the data analyzer computer from the data aggregator computer; and
analyzing the affinity group at the data analyzer computer.

10. A private computer network associated with a vehicle data service center adapted to aggregate vehicle data, comprising:
a load balancing computer (LBC) comprising memory and one or more processors, wherein the memory stores instructions executable by the one or more processors; and
a telematics server farm, comprising a plurality of telematics servers that include a first telematics server, wherein the LBC and telematics server farm are communicatively coupled,
wherein the LBC is configured to execute the instructions stored on the memory of the LBC and that, the instructions, when executed by the processor of the LBC, cause the LBC to:
process a plurality of upload messages received from a plurality of subscriber vehicles;
upon receipt of a first upload message of the plurality of upload messages, obtain unencrypted data from the first upload message;
at the LBC, obtain affinity data from the unencrypted portions of the plurality of upload messages, wherein the affinity data is data that indicates predetermined similarities between messages;
based on the affinity data, select a first telematics server associated with a telematics server farm, wherein the selection of the first telematics server is made at the LBC using the affinity data that was obtained from the unencrypted portions of the plurality of upload messages;
determine to send the first upload message to the first telematics server from among the plurality of telematics servers based on contents of the unencrypted data; prior to sending the first upload message to the first telematics server, determine whether the first telematics server is experiencing a processing delay;

when it is determined that the first telematics server is experiencing the processing delay, then select a different telematics server to send the first upload message and send the first upload message to the different telematics server, wherein the different telematics server is selected based on the contents of the unencrypted data; and when it is determined that the first telematics server is not experiencing the processing delay, then send the first upload message to the first telematics server.

11. The private computer network of claim 10, wherein the different telematics server is a second telematics server, wherein the instructions include sending at least some of the plurality of upload messages to the first and second telematics servers when the at least some of the plurality of upload messages have a common affinity.

12. The private computer network of claim 10, wherein the instructions, when executed by the processor of the LBC, cause the LBC to further:

parse the unencrypted data for a timestamp parameter associated with the first upload message; and determine to send the first upload message to the telematics server farm or determining to ignore the first upload message based on the timestamp parameter.

13. The private computer network of claim 10, wherein the instructions, when executed by the processor of the LBC, cause the LBC to further:

parse the unencrypted data for a unit identification parameter associated with a source of the first upload message, parsing the unencrypted data for a transport parameter associated with a source of the first upload message, or both; and determine to send the first upload message to the first telematics server from among the plurality of telematics servers based on the source of the first upload message.

14. The private computer network of claim 10, wherein the, when executed by the processor of the LBC, cause the LBC to further:

parse the unencrypted data for an application trigger identification parameter associated with a use case of the first upload message; and determine to send the first upload message to the first telematics server from among the plurality of telematics servers based on the use case of the first upload message.

15. The private computer network of claim 10, wherein the instructions, when executed by the processor of the LBC, cause the LBC to further: send a plurality of additional upload messages to the first telematics server or to the different telematics server based on contents of the unencrypted data of the plurality of additional upload messages.

16. The private computer network of claim 10, wherein the, when executed by the processor of the LBC, cause the LBC to further: parse the header of the first upload message, wherein at least a portion of the header includes the unencrypted data.

* * * * *